Aug. 24, 1954
C. S. SZEGHO ET AL
2,687,492
SIGNAL STORAGE DEVICE
Filed June 16, 1949
2 Sheets-Sheet 2
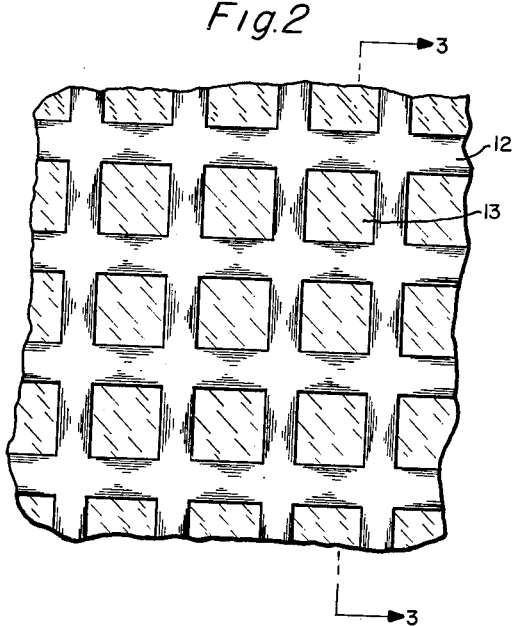
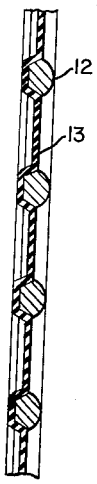
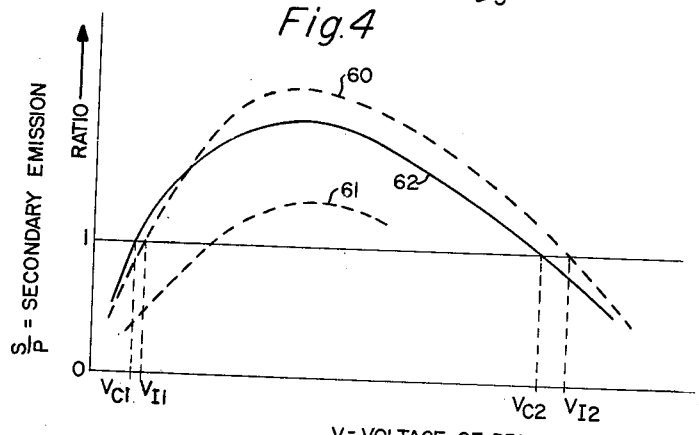
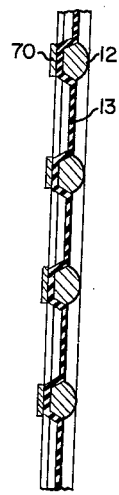
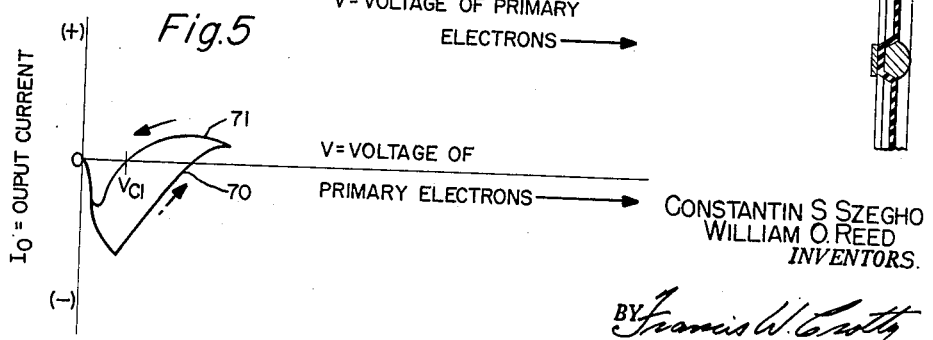
CONSTANTIN S. SZEGHO
WILLIAM O. REED
INVENTORS.
BY Francis W. Crotty
THEIR ATTORNEY Patented Aug. 24, 1954

2,687,492

UNITED STATES PATENT OFFICE 2,687,492

SIGNAL STORAGE DEVICE

Constantin Stephen Szegho and William O. Reed, Chicago, Ill., assignors to Rauland Corporation, a corporation of Illinois Application June 16, 1949, Serial No. 99,421

15 Claims. (Cl. 315—12)

This invention relates to signal-storage devices, and more particularly to electronic scanning converters, memory tubes, and the like, and to methods for operating such devices.

The use of signal-storage devices incorporating image-storage electrodes for developing a space-modulated charge image of an incoming electrical signal by scanning the surface of the storage electrode with a signal-modulated cathode-ray beam is well known in the art. Arrangements of this type have been found particularly useful for radar display purposes and the like in which it is desired to convert radar pulse-type input signals to television-type output signals for application to an image-reproducing device. Such devices as have been employed in the past are characterized by several undesirable limitations. In the first place, conventional signal-storage devices do not provide satisfactory half-tone reproduction, but operate only at either a signal condition or a no-signal condition. Thus, radar signals from an object passing through a cloud are obscured by the signals returning from the cloud itself.

Furthermore, conventional signal-storage devices are generally operated at relatively high voltages, thereby imposing severe power supply requirements.

It is, therefore, an important object of the present invention to provide an improved signal-storage device, particularly applicable for radar display purposes and the like, which is capable of half-tone storage and reproduction.

A further object of the invention is to provide such an improved signal-storage device which is adapted to be operated at relatively low power supply voltages.

In certain applications, it is desirable to provide long-time storage of the space-modulated charge image formed on the storage electrode. Simple long-time storage has been achieved in certain prior art devices, but such devices are not capable of storing half-tone signals for long time intervals.

It is, therefore, another object of the invention to provide an improved signal-storage device which is capable of storing half-tone signals for indefinitely long periods of time.

In other radar applications, it may be desired to retain a signal in diminished intensity while receiving later signals at full intensity, so that comparison may readily be made between the earlier and later signals. Operation of this type may be particularly desirable in ranging applications and the like.

Consequently, it is still another object of the present invention to provide an improved signal-storage device in which an image may be reproduced at full intensity for a short period of time and subsequently stored at diminished intensity for an indefinitely long period of time.

Prior art arrangements are also characterized by other drawbacks of a structural nature which render them difficult to produce in large quantities. For example, conventional prior art signal-storage devices utilize at least one electron gun for directing a cathode-ray beam at the storage electrode at an acute angle, and many prior art arrangements incorporate three electron guns, at least one of which is angularly disposed with respect to the storage electrode. Such constructions, in addition to rendering the device difficult to fabricate on a mass production bassis, introduce a keystoning effect which must be compensated in the associated electrical circuit to avoid distortion of the reproduced image.

Consequently, it is an important object of the invention to provide an improved signal-storage device which is particularly suited to economical large-scale production.

Yet another object of the invention is to provide a novel signal-storage device embodying not more than two electron guns physically arranged within a cylindrical evacuated envelope in such manner as to render the device practical for mass production and to obviate the requirement for keystone compensation.

In accordance with one feature of the present invention, a signal-storage device comprises a storage electrode including a conductive grid-like structure having a plurality of interstices. A secondary electron-emissive dielectric film is distributed on a single surface of the conductive structure, the dielectric film extending into and across the interstices in substantially coplanar relation with the conductive structure. An electrode system is provided for projecting a recording or writing cathode-ray beam on the storage electrode during writing intervals and for projecting a reproducing or reading cathode-ray beam on the storage electrode during reading intervals. Means are provided for modulating the writing beam during writing intervals in accordance with an electrical input signal representing an image to be stored on the storage electrode. Means are also provided for causing the writing beam to scan the storage electrode thereby to develop a space-modulated charge image of the input signal on the dielectric film during the writing intervals, and for causing the reading beam to scan the storage electrode during the reading intervals to induce current flow in the conductive grid-like structure in accordance with the space-modulated charge image. Further means are connected to the conductive structure for deriving an electrical output signal representing the image.

Another feature of the invention provides a method of storing an image represented by an electrical signal for long periods of time on a dielectric having a secondary emission ratio less than unity throughout a first range, greater than unity throughout a second range, and less than unity throughout a third range of primary electron voltages, and having a secondary emission ratio of unity at a crossover voltage between the first and second ranges. In accordance with the preferred method provided by the invention, the dielectric is biased to a positive value by scanning with electrons of a constant voltage within the second range. A space-modulated charge image of the input signal is developed on the dielectric by scanning the dielectric with a signal-modulated cathode-ray beam of voltage within either the first range or the third range. The dielectric is thereafter repeatedly scanned with electrons of voltage within the first range and near the crossover voltage between the first and second ranges.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 2 is a fragmentary view of the storage electrode of the device of Figure 1;

Figure 3 is a sectional view taken along the line 3—3 of Figure 2;

Figures 4 and 5 are graphical representations of certain operating characteristics of the device of Figure 1 which are useful in understanding its operation, and Figure 6 is a view, similar to that of Figure 3, of a storage electrode constructed in accordance with another embodiment of the invention.

Figure 1:
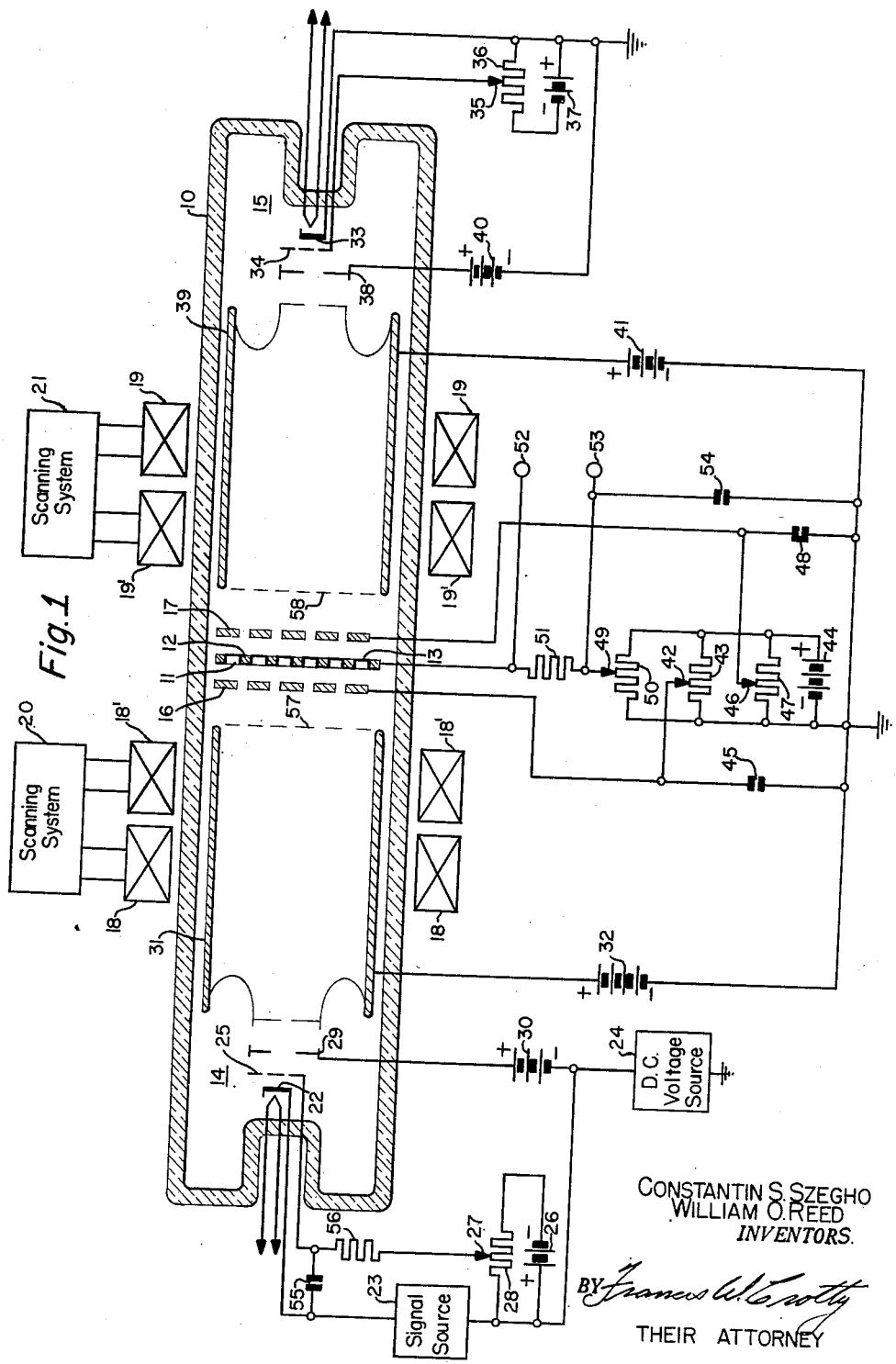
Figure 1 is a sectional view, partly schematic, of a signal-storage device constructed in accordance with the present invention.

The signal-storage device of Figure 1 comprises an evacuated glass envelope 10 which encloses a storage electrode 11 comprising a conductive grid-like structure 12 and a dielectric film 13.

The construction of storage electrode 11 is more readily apparent from a consideration of Figures 2 and 3, to which reference is now made. The grid-like conductive structure 12 is preferably formed as a conductive mesh screen, although a parallel-wire grid structure may be used, on one surface and across the interstices of which is distributed a secondary-electron-emissive dielectric film 13 which is preferably of substantially uniform thickness. In accordance with the invention, dielectric film 13 is distributed into and across the interstices of conductive mesh screen 12 in substantially coplanar relation with the screen in order to present a substantially planar surface to electrons approaching from the mesh side of the storage electrode.

With reference again to Figure 1, evacuated envelope 10 also encloses a pair of electron guns 14 and 15, which constitute an electrode system for projecting a recording or writing cathode-ray beam on storage electrode 11 during writing intervals and for projecting a reproducing or reading cathode-ray beam on storage electrode 11 during reading intervals. In operation, the reading intervals may overlap the writing intervals in point of time, and in the preferred mode of operation, continuous reading is employed, as hereinafter described in detail. Decelerating electrodes 16 and 17 are disposed on opposite sides of storage electrode 11. Magnetic focussing coils 18 and 19, and deflection coils 18' and 19', are associated with electron guns 14 and 15 and are connected to scanning systems 20 and 21, respectively, which operate to cause the writing beam to scan storage electrode 11 during writing intervals and to cause the reading beam to scan storage electrode 11 during reading intervals. Scanning systems 20 and 21 may be conventional television-type sweep-signal generators of the same or different frequency; alternatively, circular-sweep systems or any other desired type of scanning systems may be employed.

It is preferred that the image to be stored on storage electrode 11 be recorded from the insulator side thereof, and that the reproducing or reading beam scan the storage electrode 11 from the mesh side thereof, although satisfactory operation may be obtained in the reverse manner. For convenience of reference, therefore, electron gun 14 is hereinafter termed the writing gun; similarly, electron gun 15 is termed the reading gun.

The cathode 22 of writing gun 14 is returned to ground through a signal source 23 and a suitable source of unidirectional operating potential 24. The control grid 25 of electron gun 14 is maintained at a fixed direct potential relative to cathode 22 by means of a suitable negative biasing potential source, here shown as a battery 26; the bias of control grid 25 relative to cathode 22 may be adjusted as desired by means of a variable tap 27 on a resistor 28 shunting battery 26. A coupling condenser 55 is connected between cathode 22 and control grid 25, and a decoupling resistor 56 is connected between control grid 25 and variable tap 27. The first accelerating electrode 29 of electron gun 14 is maintained at a constant positive unidirectional operating potential with respect to cathode 22, as by means of a battery 30. The second accelerating electrode 31 of electron gun 14 is returned to ground through a suitable source of positive unidirectional potential, here shown as a battery 32.

The cathode 33 of electron gun 15 is preferably connected to ground. The control grid 34 of electron gun 15 is connected to a variable tap 35 on a resistor 36 which is connected to cathode 33 and in shunt with a battery 37 or other suitable negative biasing potential source. First and second accelerating electrodes 38 and 39 of electron gun 15 are maintained at suitable positive unidirectional operating potential, as by means of batteries 40 and 41 respectively.

Decelerating electrode 16 is connected to a variable tap 42 on a potentiometer resistor 43 which is connected in parallel with a battery 44 or other constant-potential source, the negative terminal of which is grounded. A bypass condenser 45 is connected between variable tap 42 and ground. Similarly, decelerating electrode 17 is connected to a variable tap 46 on a potentiometer resistor 47 which is shunted across battery 44, and a by-pass condenser 48 is connected between tap 46 and ground. Wide-mesh screens 57 and 58 are preferably provided to close the ends of the anode cylinders 31 and 39 respectively, in order to insure substantially uniform electrostatic fields between anodes 31 and 39 and decelerating electrodes 16 and 17.

The conductive portion 12 of storage electrode 11 is connected to a variable tap 49 on a potentiometer resistor 50 through a load resistor 51, and potentiometer resistor 50 is connected in parallel with battery 44. Output terminals 52 and 53 are connected to the opposite terminals of load resistor 51, and output terminal 53 is bypassed to ground by means of a condenser 54. Terminals 52 and 53 may be connected to the input circuit of a monitoring cathode-ray tube or image-reproducing device (not shown).

The preferred method of operation of the device of Figure 1 may more readily be understood by a consideration of certain operating characteristics thereof. Figure 4 is a graphical representation of the secondary emission ratios of storage electrode 11 and of its components plotted as functions of the voltage of impinging primary electrons.

While it is the primary electron velocity which determines the secondary emission ratio, this velocity is determined by the potential rise measured from the cathode where the electrons originate to the point of impingement on the target. Since this potential rise is more susceptible to direct measurement than the incident electron velocity, the characteristics are plotted with the net potential rise of the incident primary electrons as abscissae, and this net potential rise is termed the "primary electron voltage." Curve 60 represents the secondary emission characteristic of the insulator portion 13 of storage electrode 11, while curve 61 represents the secondary emission characteristic of the conductive portion 12 of storage electrode 11. Curve 62 is the secondary emission characteristic of the composite storage electrode 11. In all of these curves, the secondary emission ratio is defined as $S/P$, the number of secondary electrons emitted per impinging primary electron. The abscissa V for curve 62 represents the voltage difference between the conductive portion 12 of storage electrode 11 and the cathode whence the primary electrons originate, since this potential difference is more subject to direct measurement than the primary electron voltage averaged over the entire surface of composite storage electrode 11.

A study of the curves of Figure 4 readily indicates that three distinct operating conditions may obtain for the composite storage electrode 11. Thus, for primary electron voltages within a first range less than a first voltage $V_{c1}$, the secondary emission ratio of the composite storage electrode is less than unity, and the net electron flow is to the storage electrode, i. e., negative current. For primary electron voltages within a second range greater than the first voltage $V_{c1}$ and less than a second voltage $V_{c2}$, the secondary emission ratio is greater than unity and the net electron flow is away from storage electrode 11, i. e., positive current. Again, for primary electron voltages within a third range greater than the second voltage $V_{c2}$, the secondary emission ratio is less than unity, and negative current flows in the storage electrode 11. At the two voltages $V_{c1}$ and $V_{c2}$, the secondary emission ratio is exactly unity, and the current flowing in storage electrode 11 is zero; these voltages $V_{c1}$ and $V_{c2}$ are conventionally designated the first and second crossover voltages respectively.

Figure 5 is a graphical representation of the output current $I_o$ flowing in storage electrode 11, plotted as a function of the primary electron voltage. It is noted that a hysteresis effect is represented by the characteristic curve of Figure 5; that is, the curve 70 obtained by plotting the output current as a function of the primary electron voltage is different when plotted in accordance with data taken with increasing primary electron voltage than the curve 71 which results from plotting the data obtained for decreasing primary electron voltage. When the device of Figure 1 is operated in its preferred manner, curve 71 of Figure 5 represents the preferred operating portion of the output current characteristic.

Further study of the curves of Figure 4 reveals that curve 60, the secondary emission characteristic for the insulator portion 13 of storage electrode 11, also exhibits three distinct operating conditions separated by first and second crossover voltages $V_{I1}$ and $V_{I2}$. The first crossover voltage $V_{I1}$ of curve 60 is higher than the first crossover voltage $V_{c1}$ of curve 62, and the second crossover voltage $V_{I2}$ of curve 60 is higher than the second crossover voltage $V_{c2}$ of curve 62, although this relation is not essential; satisfactory operation has been achieved with composite structures exhibiting a first crossover voltage above the first crossover voltage $V_{I1}$ of the insulator.

The preferred mode of operation of the device of Figure 1 will now be described and explained in detail, occasional reference being had to the operating characteristics of Figures 4 and 5.

In order to condition storage electrode 11 for recording incoming signals from signal source 23, the potential of conductive portion 12 of storage electrode 11 is raised by means of tap 49 on potentiometer 50 to a value between the first and second crossover voltages $V_{I1}$ and $V_{I2}$ of the insulator portion 13 of composite storage electrode 11. During the conditioning process, writing gun 14 may be temporarily cut off, as by biasing control grid 25 to a high negative value by means of variable tap 27 on potentiometer 28; however, since electrons from the writing gun cannot reach conductive portion 12 of storage electrode 11, it is not necessary to cut off the writing gun. Control electrode 34 of reading gun 15 is biased by suitable adjustment of variable tap 35 on potentiometer 36 to permit passage of an electron beam from cathode 33, and the electron beam from cathode 33 is caused to scan storage electrode 11 by means of suitable deflection voltages applied to deflection coils 19' from scanning system 21.

Because the primary electron voltage is greater than $V_{c1}$, the number of secondary electrons emitted is greater than the number of incident primary electrons, and a positive charge is built up on the surface of storage electrode 11. The action is cumulative until such time as the charge potential of insulator portion 13 of storage electrode 11 is substantially the same as the potential applied to conductive mesh 12 from battery 44 by means of potentiometer 50; decelerating electrodes 16 and 17 are maintained at or near the potential applied to conductive mesh 12 by suitable adjustment of variable taps 42 and 46 on potentiometers 43 and 47, respectively, and serve to maintain a substantially uniform field for the incident primary electrons. When the charge on insulator portion 13 of storage electrode 11 has reached a potential substantially equal to that of conductive mesh 12, an equilibrium condition is obtained, and further scanning of storage electrode 11 by the electron beam of reading gun 15 has no further substantial effect on the charge distribution on storage electrode 11.

The unidirectional operating potential applied to conductive mesh 12 is now lowered by means of variable tap 49 on potentiometer 50 to a value preferably just above $V_{c1}$, the first crossover potential of the composite storage electrode, and just below $V_{11}$, the first crossover potential of the insulator, in order to bias the conductive mesh 12 to a lower voltage than that to which the insulator portion 13 is charged, thereby to reduce the tendency of subsequently stored negative charges to leak off through the insulator to the mesh. The charge on the insulator portion 13 remains at a potential well above the first crossover voltage $V_{11}$, and the majority of the incident primary electrons from cathode 33 impinge on insulator portion 13. Secondary electrons emitted from the insulator are either collected by decelerating electrode 17 or returned to insulator portion 13 thereby slightly lowering the charge potential. However, the charge on insulator portion 13 is still maintained at a potential higher than the first crossover potential $V_{11}$ of curve 60.

Writing gun 14 is now prepared to store an image on electrode 11 by reducing the bias on the control grid 25 by means of variable tap 27 on potentiometer 28, and the unidirectional operating potential of cathode 22 is adjusted to some small positive value by means of D. C. voltage source 24 so that electrons from writing gun 14 impinge on insulator portion 13 of storage electrode 11 at an effective potential below the first crossover voltage $V_{11}$ of the insulator. Signals representing the image to be stored are supplied to cathode 22 from signal source 23 to effect velocity modulation of the writing beam, and deflection coils 18' are energized by scanning system 20 to cause the writing beam to scan insulator portion 13 of storage electrode 11. Because the writing electrons impinge on insulator portion 13 at an effective voltage below the first crossover potential $V_{11}$ of the insulator, the number of secondary electrons emitted is less than the number of incident primary electrons, and the insulator assumes a negative charge distribution to form a space-modulated charge image of the input signal from source 23.

Alternatively, the potential of cathode 22 may be adjusted to a large negative value by means of D. C. voltage source 24 so that the writing electrons impinge on insulator portion 13 of storage electrode 11 at an effective voltage greater than the second crossover voltage $V_{12}$ of the insulator; such an arrangement also results in a negative charge distribution on dielectric film 13 constituting a space-modulated charge image of the input signal from source 23.

Because the space-modulated charge image now appearing on insulator portion 13 of storage electrode 11 is less positive than the potential to which the insulator was biased by means of reading gun 15, the effective voltage of reading electrons is reduced below the first crossover voltage $V_{c1}$ of the composite storage electrode 11. Thus, as shown by curve 71 (Figure 5) the current drawn by conductive mesh 12 is of negative polarity, and since the insulator portion 13 is constructed to be substantially coplanar with conductive mesh 12, the charge distribution on insulator portion 13 produces an electrostatic field distribution in the region between storage electrode 11 and decelerating electrode 17 which operates substantially as the electrostatic field of a control grid. Therefore, the amount of negative current drawn by conductive mesh 12 is controlled by the charge distribution of the space-modulated charge image stored on insulator portion 13. Consequently, a voltage is induced across load resistor 51, connected to conductive mesh 12, to provide an output signal which corresponds to the space-modulated charge image on insulator portion 13.

In the preferred embodiment, zero current in conductive mesh 12 is established as black level on an associated monitor device (not shown) coupled to terminals 52 and 53, and positive currents in conductive mesh 12 represent images which are blacker than black. However, since the output current representing the space-modulated charge image is negative and varies in intensity in substantially linear fashion throughout the operating range just below $V_{c1}$ (curve 71 of Figure 5), half-tone storage and reproduction are obtained.

The storage time obtainable with conventional signal-storage devices is dependent on the leakage properties of the insulator. Thus, the maximum time for which an image may be stored is dependent on the time which it takes for the stored charge distribution to discharge through the insulator. The device of Figure 1 affords a very substantial advantage over such conventional prior art devices in that it permits image storage for an indefinitely long period of time which is not dependent on the leakage properties of the insulator.

Such long-time storage may be provided by adjusting the unidirectional operating potential of conductive mesh 12, after the space-modulated charge image has been stored on insulator portion 13, to a value at or near the first crossover potential $V_{c1}$ of the composite storage electrode 11. Since the charge potential on each elemental area of insulator portion 13 of storage electrode 11 is below the first crossover potential $V_{11}$ for the insulator, the net current flow to insulator portion 13 due to the reading beam is negative. In practice, for permanent storage of the space-modulated charge image, the operating potential of conductive mesh 12 is adjusted to such a value that the net negative current to each elemental area of insulator portion 13 from reading gun 15 is just sufficient to replenish the negative charge which leaks off from that elemental area between scansions thereof by the reading beam. The charge leakage from areas of high negative charge potential is greater than that from areas of low negative charge potential; however, the effective voltage of the incident primary electrons from reading gun 15 is lower at elemental areas of most negative charge, and consequently, the net negative current flow to such highly negative elemental areas is greater than that to less negative elemental areas. Since the current characteristic of Figure 5 is substantially linear throughout the operating region below the first crossover voltage $V_{c1}$, the charge-replenishing action of the reading beam substantially compensates for the varying charge leakage over the dielectric surface due to the differences in negative charge between different elemental areas.

As a further modification it is possible to store an image at full intensity for a short period of time and subsequently to reduce the intensity of the stored image to a lower value which may then be retained for an indefinitely long period of time. This may be accomplished by operating the conductive mesh 12 after storage of the incoming signal at a unidirectional voltage equal to the first crossover voltage $V_{c1}$ for the composite storage electrode 11 to obtain full intensity for the desired period of time, then increasing the voltage of conductive mesh 12 to a value above $V_{11}$ so that the insulator tends to acquire a uniform positive charge until the image intensity has decreased to the desired value, and subsequently returning the unidirectional operating potential of conductive mesh 12 to the first crossover voltage $V_{c1}$ for permanent storage of the image of reduced intensity. It is, of course, understood that for such long-time storage, the reading beam from reading gun 15 is caused to scan the storage electrode 11 repeatedly to replenish the leaked-off charge as described above. If a nearly perfect insulator is used, reading gun 15 may be turned off for a period of hours without substantial decay in the charge intensity. This method of operation is particularly useful in connection with radar operations in which it is desired to compute the course of a ship or airplane; the earlier position may be made to appear in diminished intensity while the present position may be plotted at full intensity. In this manner confusion between the two positions is substantially eliminated. Of course, a fixed or non-moving object will appear always at full intensity.

The operation of the device of Figure 1 has been described in its preferred mode. It is recognized that other modes of operation may be employed and may even be preferred in particular applications. For example, amplitude modulation rather than velocity modulation may be used on the writing beam from writing gun 14; to achieve this mode of operation, cathode 22 is maintained at a fixed potential, and the potential of control grid 25 is varied in accordance with the incoming signal. This mode of operation is particularly advantageous when it is desired to utilize a writing beam of high voltage above the second crossover potential, but may also be used to advantage with low voltage writing beams below the first crossover potential.

It may also be desired to store a black signal on a white background, and for this purpose it is possible to bias storage electrode 11 negatively by scanning with electrons below the first crossover potential or above the second crossover potential and to write with electrons of voltage between the first and second crossover potentials to produce a positive charge distribution on storage electrode 11 which corresponds to a space-modulated charge image of the input signal.

Furthermore, in those applications in which it is desired to modulate the writing beam at frequencies in the same range as the scanning frequency of the reading beam, it may be desirable to create a frequency difference between the reading and writing signals by modulating the reading beam at some frequency well above the maximum contained in the writing signals. The output signal developed across load resistor 51 then assumes the form of an amplitude-modulated high-frequency carrier, which may thereafter be amplified and rectified in a conventional manner to provide the desired output signal having no writing-modulation component.

Furthermore, by judicious switching in the external circuit, a single electron gun may be used for both reading and writing purposes.

One of the primary advantages of the structure provided by the present invention is the effective control which it provides for the storage time. Thus, the storage time is controllable, by simple adjustment of the operating potential applied to the conductive portion of the storage electrode, over a range from very short storage times (operating potential substantially greater than first crossover $V_{c1}$) to indefinitely long periods of time (operating potential at first crossover $V_{c1}$).

As a further advantage of the signal storage device provided by the present invention, half-tone storage and reproduction may be obtained throughout any desired period of time, and no erasing signal or chasing beam, as used in many prior art devices, is required to wipe out the established charge image and to prepare the storage electrode to receive a new charge image. With the device provided by the present invention in accordance with the preferred mode of operation, the old charge image is wiped out and the storage electrode is prepared to store a new charge image merely by raising the operating potential of the conductive portion of the storage electrode to a value well above the first crossover potential $V_{c1}$ and scanning with the reading beam until a positive charge background is established for storage of the new signal.

Merely by way of illustration, and in no sense by way of limitation, operation in the preferred mode for long-time storage may be obtained by using the following operating potentials in the system of Fig. 1. Conductive mesh screen 12 may be initially raised to a potential of $+150$ volts and scanned with a reading beam originating at cathode 33, which is maintained at ground potential, in order to bias dielectric portion 13 to a positive potential of about 150 volts. Conductive mesh screen 12 may then be lowered to a potential of $+75$ volts, dielectric portion 13 maintaining its charge at about $+90$ volts, and the space-modulated charge image is produced on dielectric portion 13 by means of a signal modulated writing beam originating at cathode 22, which is maintained at a positive unidirectional operating potential of about 75 volts. After the space-modulated charge image is formed, the potential of conductive mesh screen 12 may be lowered to about $+65$ volts ($V_{c1}$) to obtain long-time storage. The potentials applied to decelerating electrodes 16 and 17 are not critical and may be set at about $+100$ to $+150$ volts, and the operating potentials of accelerating electrodes 31 and 39 may be set at about 1 kilovolt. Under these conditions, half-tone storage and reproduction may be observed for an indefinitely long period of time. It is noted that no unidirectional operating potential in excess of about 1 kilovolt is required; thus, the power supply requirements for the device of Figure 1 are materially less stringent than those for conventional prior art image-storage devices.

With reference again to Figures 2 and 3, the preferred storage electrode construction illustrated therein comprises a conductive grid-like structure 12 having a plurality of interstices, and a secondary electron-emissive dielectric film 13 distributed on one surface of structure 12 and across the interstices in substantially coplanar relation with structure 12. In accordance with a preferred embodiment of the invention, grid-like structure 12 may consist of a conductive mesh screen constructed of gold, chromium, or other suitable material, and dielectric film 13 may be constructed of silicon dioxide, aluminum oxide, a fluoride of calcium, barium, or magnesium or other suitable material.

Merely by way of illustration, a method for producing the storage electrode which has been successfully employed comprises disposing an organic film, of nitrocellulose or the like, in contact with a gold mesh screen of as fine a mesh as possible. Silicon dioxide is then evaporated in a low pressure of oxygen onto the mesh side of the organic film, and this process is repeated a number of times from different approach angles to provide uniformity of dielectric film thickness and to insure complete coverage of the mesh by the dielectric film. The nitrocellulose film is drawn into the interstices of the gold mesh by surface tension, so that the dielectric film is disposed across the interstices in substantially coplanar relation with the mesh. The nitrocellulose film is then dissolved in amyl acetate or other suitable solvent, and the structure is rinsed in a mixture of alcohol and ether to remove any remaining traces of the organic film. The mesh size of screen 12 determines the resolution of the reproduced image and is preferably made as fine as practicable. A 0.2-mil thick gold screen having 400 openings per lineal inch has been successfully used for structure 12, and a dielectric film thickness of from 1,000 to 3,000 Angstrom units hav been found satisfactory.

Alternatively, it is possible to construct storage electrode 11 by evaporating silicon dioxide or other suitable material in oxygen maintained at low pressure onto a nitrocellulose film, stretched across a supporting ring, to provide a dielectric film of uniform thickness. Gold, chromium, or other suitable material having a directional evaporation characteristic may then be evaporated through a grating of the desired fineness onto the dielectric film to provide the finished structure. The organic supporting film may then be dissolved as before.

The above methods for constructing the storage electrode have been set forth merely as illustrative examples. Other methods of producing the desired structure may occur to those skilled in the art, and the invention is not to be restricted to the above illustrative examples.

In accordance with still another feature of the invention, it has been found that improved operation at low voltages may be attained by evaporating conductive metal deposits onto the insulator side of the storage electrode to reduce the influence of adjacent charges on each other. Preferably, the conductive metal deposits should be placed in transverse alignment with the conductive metal bars of screen 12. Such a construction is illustrated in Figure 6, in which the additional conductive metal deposits 70 are shown in transverse alignment with the conductive portions of mesh screen 12. It is preferred that conductive deposits 70 be disposed on the insulator side of the storage electrode in one direction only.

In summary, the present invention provides a novel signal-storage device which is particularly adaptable for use as a scanning converter, memory tube or the like. The device is eminently suitable for half-tone storage and reproduction, and, in accordance with a preferred method of operating, is capable of achieving image storage for indefinitely long periods of time. As a further advantage, satisfactory operation of the device is attained at materially lower operating potentials than in the case of conventional prior art image-storage devices, thereby materially reducing the stringency of the power supply requirements.

While particular embodiments of the present invention have been shown and described, it is apparent that various changes and modifications may be made, and it is therefore contemplated in the appended claims to cover all such changes and modifications as fall within the true spirit and scope of the invention.

We claim:

1. A signal-storage device comprising: a storage electrode including a conductive grid-like structure having a plurality of interstices and a secondary electron-emissive dielectric film distributed on a single surface of said structure and across said interstices in substantially coplanar relation with said structure; an electrode system for projecting a writing cathode-ray beam on said storage electrode during writing intervals and for projecting a reading cathode-ray beam on said storage electrode during reading intervals; means for modulating said writing beam during said writing intervals in accordance with an electrical input signal representing an image to be stored in said device; means for causing said writing beam to scan said storage electrode to develop a space-modulated charge image of said input signal on said dielectric film during said writing intervals and for causing said reading beam to scan said storage electrode to induce current flow in said grid-like structure in accordance with intensity-control of said reading beam by said space-modulated charge image during said reading intervals; and means connected to said grid-like structure for deriving an electrical output signal representing said image.

2. A signal-storage device comprising: a storage electrode including a conductive mesh screen having a plurality of interstices and a secondary electron-emissive dielectric film of substantially uniform thickness distributed on a single surface of said screen and across said interstices in substantially coplanar relation with said screen; an electrode system for projecting a writing cathode-ray beam on said storage electrode during writing intervals and for projecting a reading cathode-ray beam on said storage electrode during reading intervals; means for modulating said writing beam during said writing intervals in accordance with an electrical input signal representing an image to be stored in said device; means for causing said writing beam to scan said storage electrode to develop a space-modulated charge image of said input signal on said dielectric film and for causing said reading beam to scan said storage electrode to induce current flow in said screen in accordance with intensity-control of said reading beam by said space-modulated charge image during said reading intervals; and means connected to said screen for deriving an electrical output signal representing said image.

3. A signal-storage device comprising: a storage electrode including a conductive mesh screen having a plurality of interstices and a secondary electron-emissive dielectric film of substantially uniform thickness distributed on a single surface of said screen and across said interstices in substantially coplanar relation with said screen; a first electron gun for propecting a writing cathode-ray beam on one surface of said storage electrode; means for modulating said writing beam in accordance with an electrical input signal representing an image to be stored in said device; means for causing said modulated writing beam to scan said one surface for developing a space-modulated charge image of said input signal on said dielectric film; a second electron gun for projecting a reading cathode-ray beam on the opposite surface of said storage electrode; means for causing said reading beam to scan said opposite surface to induce current flow in said screen in accordance with intensity-control of said reading beam by said space-modulated charge image; and means connected to said screen for deriving an electrical output signal representing said image.

4. A storage electrode for a signal-storage device consisting essentially of: a conductive grid-like structure having a plurality of interstices; and a secondary electron-emissive dielectric film distributed on a single surface of said structure, said film extending into and across said interstices in substantially coplanar relation with said structure.

5. A storage electrode for a signal-storage device consisting essentially of: a conductive grid-like structure having a plurality of interstices; and a thin secondary electron-emissive dielectric film of substantially uniform thickness distributed on a single surface of said structure, said film extending into and across said interstices in substantially coplanar relation with said structure.

6. A storage electrode for a signal-storage device consisting essentially of: a conductive mesh screen having a plurality of interstices; and a secondary electron-emissive dielectric film of substantially uniform thickness distributed on a single surface of said screen, said film extending into and across said interstices in substantially coplanar relation with said screen.

7. A storage electrode for a signal-storage device comprising: a grid-like structure including a plurality of substantially parallel conductive elements and having a plurality of interstices; a thin dielectric film distributed on one surface of said structure and across said interstices in substantially coplanar relation with said structure; and conductive metal deposits disposed in contact with said film substantially in alignment with said conductive elements.

8. A signal-storage device comprising: a storage electrode including a conductive grid-like structure having a plurality of interstices and a secondary-electron-emissive dielectric film distributed on a single surface of said structure, said film extending into and across said interstices in substantially coplanar relation with said structure; an electrode system for projecting a writing cathode-ray beam on said storage electrode during writing intervals and for projecting a reading cathode-ray beam on said storage electrode during reading intervals; means for modulating said writing beam during said writing intervals in accordance with an electrical input signal representing an image to be stored in said device; means for causing said writing beam to scan said storage electrode to develop a space-modulated charge image of said input signal on said dielectric film during said writing intervals and for causing said reading beam to scan said storage electrode to induce current flow in said grid-like structure in accordance with intensity-control of said reading beam by said space-modulated charge image during said reading intervals; and means connected to said grid-like structure for deriving an electrical output signal representing said image.

9. A signal-storage device comprising: a storage electrode including a conductive mesh screen having a plurality of interstices and a secondary-electron-emissive dielectric film of substantially uniform thickness distributed on a single surface of said screen, said film extending into and across said interstices in substantially coplanar relation with said screen; a first electron gun for projecting a writing cathode-ray beam on one surface of said storage electrode; means for modulating said writing beam in accordance with an electrical input signal representing an image to be stored in said device; means for causing said modulated writing beam to scan said one surface for developing a space-modulated charge image of said input signal on said dielectric film; a second electron gun coaxial with said first electron gun for projecting a reading cathode-ray beam on the opposite surface of said storage electrode; means for causing said reading beam to scan said opposite surface to induce current flow in said screen in accordance with intensity-control of said reading beam by said space-modulated charge image; and means connected to said screen for deriving an electrical output signal representing said image.

10. A signal-storage device comprising: a storage electrode including a conductive mesh screen having a plurality of interstices and a secondary-electron-emissive dielectric film of substantially uniform thickness distributed on a single surface of said screen, said film extending into and across said interstices in substantially coplanar relation with said screen; a first electron gun for projecting a writing cathode-ray beam on the dielectric surface of said storage electrode; means for modulating said writing beam in accordance with an electrical input signal representing an image to be stored in said device; means for causing said modulated writing beam to scan said dielectric surface for developing a space-modulated charge image of said input signal on said dielectric film; a second electron gun coaxial with said first electron gun for projecting a reading cathode-ray beam on the screen surface of said storage electrode; means for causing said reading beam to scan said screen surface to induce current flow in said screen in accordance with intensity-control of said reading beam by said space-modulated charge image; and means connected to said screen for deriving an electrical output signal representing said image.

11. A signal-storage device for storing halftone charge images and for retaining said stored images for prolonged periods of time, said device comprising: a storage electrode including a conductive grid-like structure having a plurality of interstices and a secondary-electron-emissive dielectric film affixed to a single surface of said structure, said dielectric extending into and across said interstices in substantially coplanar relation with said structure and having a secondary emission ratio less than unity throughout a first range and greater than unity throughout a second range of primary electron voltages and having a secondary emission ratio of unity at a crossover voltage between said first and second ranges; a first electron gun for projecting a writing cathode-ray beam onto said storage electrode; a second electron gun for projecting a reading cathode-ray beam onto said storage electrode; means for adjusting the voltage of said reading beam to a constant value within said second range for positively biasing said dielectric; means for subsequently adjusting the voltage of said writing beam to a value within said first range and for modulating said beam in accordance with an electrical input signal to establish on said dielectric a stored charge image corresponding to said input signal; means for adjusting the voltage of said reading beam to a value within said first range and near said crossover voltage and for causing said reading beam to scan said storage electrode repeatedly, whereby said stored charge image may be retained for a protracted time interval independent of the leakage properties of said dielectric; and means connected to said grid-like structure for deriving an electrical output signal representing said stored charge image.

12. A signal-storage device for storing half-tone charge images and for retaining said stored images for prolonged periods of time, said device comprising: a storage electrode including a conductive mesh screen having a plurality of interstices and a secondary-electron-emissive dielectric film of substantially uniform thickness distributed on a single surface of said screen, said dielectric extending into and across said interstices in substantially coplanar relation with said screen and having a secondary emission ratio less than unity throughout a first range and greater than unity throughout a second range of primary electron voltages with a secondary emission ratio of unity at a crossover voltage between said first and second ranges; a first electron gun for projecting a writing cathode-ray beam onto said storage electrode; a second electron gun for projecting a reading cathode-ray beam onto said storage electrode; means for adjusting the voltage of said reading beam to a constant value within said second range for positively biasing said dielectric; means for subsequently adjusting the voltage of said writing beam to a value within said first range and for modulating said beam in accordance with an electrical input signal to establish on said dielectric a stored charge image corresponding to said input signal; means for adjusting the voltage of said reading beam to a value within said first range and near said crossover voltage and for causing said reading beam to scan said storage electrode repeatedly, whereby said stored charge image may be retained for a protracted time interval independent of the leakage properties of said dielectric; and means connected to said screen for deriving an electrical output signal representing said stored charge image.

13. A signal-storage device for storing half-tone charge images and for retaining said stored images for prolonged periods of time, said device comprising: a storage electrode including a conductive mesh screen having a plurality of interstices and a secondary-electron-emissive dielectric film of substantially uniform thickness distributed on a single surface of said screen, said dielectric extending into and across said interstices in substantially coplanar relation with said screen and having a secondary emission ratio less than unity throughout a first range and greater than unity throughout a second range of primary electron voltages with a secondary emission ratio of unity at a crossover voltage between said first and second ranges; a first electron gun for projecting a writing cathode-ray beam onto one surface of said storage electrode; a second electron gun for projecting a reading cathode-ray beam onto the opposite surface of said storage electrode; means including said second electron gun for positively biasing said dielectric; means for subsequently adjusting the voltage of said writing beam to a value within said first range and for modulating said beam in accordance with an electrical input signal to establish on said dielectric a stored charge image corresponding to said input signal; means for adjusting the voltage of said reading beam to a value within said first range and near said crossover voltage and for causing said reading beam to scan said storage electrode repeatedly, whereby said stored charge image may be retained for a protracted time interval independent of the leakage properties of said dielectric; and means connected to said screen for deriving an electrical output signal representing said stored charge image.

14. A signal-storage device for storing half-tone charge images and for retaining said stored images for prolonged periods of time, said device comprising: a storage electrode including a conductive mesh screen having a plurality of interstices and a secondary-electron-emissive dielectric film of substantially uniform thickness distributed on a single surface of said screen, said dielectric extending into and across said interstices in substantially coplanar relation with said screen and having a secondary emission ratio less than unity throughout a first range and greater than unity throughout a second range of primary electron voltages with a secondary emission ratio of unity at a crossover voltage between said first and second ranges; a first electron gun for projecting a writing cathode-ray beam onto the dielectric surface of said storage electrode; a second electron gun for projecting a reading cathode-ray beam onto the screen surface of said storage electrode; means including said second electron gun for positively biasing said dielectric; means for subsequently adjusting the voltage of said writing beam to a value within said first range and for modulating said beam in accordance with an electrical input signal to establish on said dielectric a stored charge image corresponding to said input signal; means for adjusting the voltage of said reading beam to a value within said first range and near said crossover voltage and for causing said reading beam to scan said storage electrode repeatedly, whereby said stored charge image may be retained for a protracted time interval independent of the leakage properties of said dielectric; and means connected to said screen for deriving an electrical output signal representing said stored charge image.

15. A signal-storage device for storing half-tone charge images and for retaining said stored images for prolonged periods of time, said device comprising: a storage electrode including a conductive grid-like structure having a plurality of interstices and a secondary-electron-emissive dielectric film distributed on a single surface of said screen, said dielectric extending into and across said interstices in substantially coplanar relation with said structure and having a secondary emission ratio less than unity throughout a first range and greater than unity throughout a second range of primary electron voltages with a secondary emission ratio of unity at a crossover voltage between said first and second ranges; a first electron gun for projecting a writing cathode-ray beam onto said storage electrode; a second electron gun for projecting a reading cathode-ray beam onto said storage electrode; means for adjusting the voltage of said reading beam to a constant value within said second range for positively biasing said dielectric; means for subsequently adjusting the voltage of said writing beam to a value within said first range and for modulating said beam in accordance with an electrical input signal to establish on said dielectric a stored charge image corresponding to said input signal; means for adjusting and maintaining the voltage of said reading beam at a value within said second range for a short time interval and for readjusting said reading beam voltage immediately thereafter to a value within said first range and near said crossover voltage, while causing said reading beam to scan said storage electrode repeatedly, whereby said stored charge image is diminished in intensity and as so diminished may be retained for a protracted time interval independent of the leakage properties of said dielectric; and means connected to said grid-like structure for deriving an electrical output signal representing said stored charge image.

References Cited in the file of this patent

UNITED STATES PATENTS

| Number | Name | Date |
|---|---|---|
| 2,190,020 | Goldsmith | Feb. 13, 1940 |
| 2,237,681 | McGee et al. | Apr. 8, 1941 |
| 2,245,364 | Riesz et al. | June 12, 1941 |
| 2,281,280 | Gabor | Apr. 28, 1942 |
| 2,452,619 | Weimer | Nov. 2, 1948 |
| 2,454,652 | Iams et al. | Nov. 23, 1948 |
| 2,481,458 | Wertz | Sept. 6, 1949 |
| 2,547,638 | Gardner | Apr. 3, 1951 |